United States Patent [19]
Takei et al.

[11] Patent Number: 5,897,047
[45] Date of Patent: Apr. 27, 1999

[54] METHOD OF CONNECTING STEEL PART WITH ALUMINUM PART AND PRODUCT MADE BY THE SAME

[75] Inventors: Nobuo Takei, Urayasu; Shigeru Takabe, Sagamihara, both of Japan

[73] Assignee: Ishikawajima-Harima Heavy Industries Co., Ltd., Tokyo, Japan

[21] Appl. No.: 08/709,756

[22] Filed: Sep. 9, 1996

[30] Foreign Application Priority Data

Oct. 26, 1995 [JP] Japan ..................................... 7-279033

[51] Int. Cl.$^6$ ..................................................... B23K 20/12
[52] U.S. Cl. ........................ 228/114; 228/114.5; 148/531
[58] Field of Search ................... 228/112.1, 114, 228/114.5, 2.3; 148/529, 530, 531, 535

[56] References Cited

U.S. PATENT DOCUMENTS

| | | |
|---|---|---|
| 3,631,585 | 1/1972 | Stamm . |
| 3,693,238 | 9/1972 | Hoch et al. ............................ 228/113 |
| 3,831,245 | 8/1974 | Amos .................................. 228/114.5 |
| 4,542,846 | 9/1985 | Matsui et al. ........................ 228/114.5 |
| 4,594,020 | 6/1986 | Hughes .................................. 403/343 |
| 5,138,114 | 8/1992 | Breit et al. ............................. 228/120 |

FOREIGN PATENT DOCUMENTS

| | | |
|---|---|---|
| 0 368 642 | 5/1990 | European Pat. Off. . |
| 0 513 646 A1 | 11/1992 | European Pat. Off. . |
| 0 514 040 A1 | 11/1992 | European Pat. Off. . |
| 2 545 022 | 11/1984 | France . |
| 40 28 985 | 3/1992 | Germany . |

OTHER PUBLICATIONS

Metals Handbook Ninth Edition, vol. 6, "Friction Welding", pp. 719–728, 1983.

"Friction Welding of 2017 Aluminum Alloy and S45C Carbon Steel Using An Insert" Welding International, vol. 8, No. 6, Jan. 1, 1994, pp. 445–451.

*Primary Examiner*—Samuel M. Heinrich
*Attorney, Agent, or Firm*—McCormick, Paulding & Huber

[57] ABSTRACT

A method of connecting an aluminum part with a steel part using a friction welding technique. The aluminum part is heat treated such as T6 treatment to raise its hardness. After that, the aluminum part is friction welded to the steel part. The steel part may also be heat treated to lower its hardness instead of or in addition to hardening of the aluminum part. A third part which has an intermediate hardness may be placed between the aluminum part and the steel part, and the aluminum part may be coupled with the steel part via the third part.

12 Claims, 3 Drawing Sheets

METHOD OF CONNECTING STEEL PART WITH ALUMINUM PART AND PRODUCT MADE BY THE SAME

BACKGROUND OF THE INVENTION

1. Technical Field

The present invention relates to a method of connecting a carbon steel shaft with an aluminum member and a product made by this method. The method of the invention is applicable, for example, to productions of rotors for a screw compressor and for a Roots blower.

2. Background Art

Various screw compressors are know in the art. A screw compressor used as a supercharger for an automobile (e.g., a Lysholm compressor) includes a first screw-shaped male rotor, a second screw-shaped female rotor engaged with the first rotor and a casing for housing the first and second rotors in a way that the first and second rotors can rotate in opposite directions. The screw compressor sucks an external air from an opening formed at one end of its casing, the sucked air is gradually compressed by the first and second rotors inside the casing in an axial direction of the casing, and the compressed air is discharged from another opening formed at the opposite end of the casing. Each rotor has its own shafts which outwardly extend from ends of the rotor, and the shafts are supported by bearings or the like. The rotor rotates as its shafts are rotated.

One example of such a male or female rotor of the screw compressor is illustrated in FIG. 7 of the accompanying drawings. A rotor 38 has a shaft 42 and a profile portion 40 fitted over the shaft 42. The profile portion 40 has threads or ridges 48 on its outer periphery. The profile portion 40 is made from an aluminum alloy and the shaft 42 is made from carbon steel. Conventionally, the profile portion 40 is shrinkage-fitted over the shaft 42 or the profile portion 40 is molded over the shaft 42 by an insert molding technique.

However, the shrinkage fitting technique requires a certain strength on the profile portion 40. Therefore, an inexpensive aluminum alloy cannot be used as the profile portion 40. In addition, a through hole 50 must be drilled in the profile portion 40 for insertion of the shaft 42. This process raises a manufacturing cost. Furthermore, the rotor 38 is relatively heavy since its major portion is constituted by the steel shaft 44.

If the insert molding process is employed to prepare a shaft-profile combined element, a linear expansion coefficient of a center portion 44 of the shaft 42 which is positioned in the aluminum profile 40 should conform with that of the aluminum member 40 whereas a linear expansion coefficient of ends 46 of the shaft 42 on which steel parts such as a bearing and a gear are mounted should conform with that of the steel member. In short, the center portion 44 and ends 46 of the shaft 42 should be made from different materials. Furthermore, the rotor 38 is relatively heavy since it is mostly constituted by the steel shaft 44.

SUMMARY OF THE INVENTION

One object of the present invention is to provide a method of connecting an aluminum profile with a steel shaft or producing a single product from an aluminum member and a steel member which does not have the above described problems of the prior art methods.

According to one aspect of the present invention, there is provided a method of connecting a steel shaft with an aluminum profile comprising the steps of at least heat treating one end face of the aluminum profile such that strength of the end face of the aluminum profile be closer to that of the steel shaft and pressing the steel shaft against the end face of the aluminum profile while rotating the steel shaft relative to the end face of the aluminum profile or vice versa in order to peel an oxide film from the end face of the aluminum profile and from the steel shaft at their interface by their frictional movements, thereby friction welding the steel shaft onto the end face of the aluminum profile. Another shaft may be attached to the other end face of the aluminum profile later by a similar manner, or two shafts may be friction welded onto opposite end faces of the aluminum profile simultaneously.

Generally an aluminum part is considerably different from a carbon steel part in hardness so that simply pressing these parts against each other with some relative rotation does not result in friction welding of the two parts. It only removes an oxide film from a surface of the aluminum part at an interface since the aluminum part is softer or weaker than the carbon steel part. An oxide film remains on the steel part. Having the oxide film on its surface, the steel part cannot be friction welded onto another part. To deal with this problem, the aluminum part is hardened to particular hardness, which is closer to the steel part, by the heat treatment before friction welding. Forcing one part against another part, which two parts have similar hardness, can remove the oxide films from both of the parts substantially equally so that the interfaces of these parts are activated and firm metal-to-metal bonding becomes possible. The peeled oxide films are pushed aside upon relative rotation of the two parts. Since this connection method depends on the metal-to-metal bonding, an inexpensive aluminum alloy can be used as the aluminum profile. This is an outstanding advantage over a conventional method which relies upon shrinkage fitting. Further, since the steel shaft is attached to the end face of the aluminum profile, drilling a through hole in the aluminum profile is not needed. This reduces a manufacturing cost as compared with the above described two conventional methods. If the method of the present invention is compared with the insert molding method, it is unnecessary to conform the coefficient of the steel shaft with that of the aluminum profile or to make the shaft from different materials. Moreover, since the steel part does not penetrate the aluminum part, a total weight of the combined parts (i.e., a rotor made from an aluminum part and a carbon steel part) is lightened as compared with the two conventional methods.

According to a second aspect of the present invention, there is provided a method of coupling a steel shaft to an aluminum profile comprising the steps of preparing a third member having an intermediate hardness of between the steel shaft and the aluminum profile, and attaching the third member to the aluminum profile at its one end thereof and to the steel shaft at the other end thereof. The attaching step may be carried out by pressing one part against the other part with relative rotation (i.e., friction welding). The third member may be a stainless member. Since there is no considerable difference between the aluminum part and the stainless part and between the stainless and the steel part in hardness and strength, it is not necessary to heat treat the aluminum part to make its hardness closer to the steel part. In other words, the oxide films are removed from the aluminum part, stainless part and steel part by frictional rotation between them.

BRIEF DESCRIPTION OF THE ACCOMPANYING DRAWINGS

DETAILED DESCRIPTION OF THE PREFERRED EMBODIMENTS

Now, preferred embodiments of the present invention will be described with reference to FIGS. 1 to 6 of the accompanying drawings.

Figure 1:
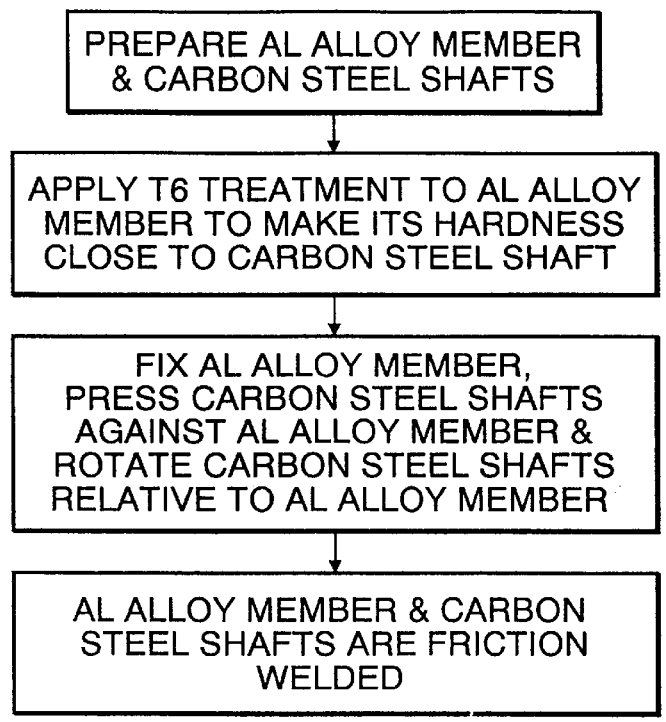
FIG. 1 is a chart of process for coupling steel parts with an aluminum part according to one embodiment of the present invention.
Figure 2:
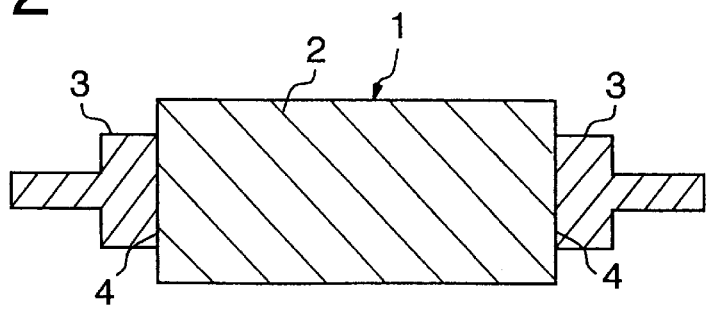
FIG. 2 illustrates a sectional view of a rotor manufactured by the process shown in FIG. 1, which rotor may be used for a screw compressor.

FIGS. 1 and 2 illustrate a first embodiment.

Referring to FIG. 1, indicated is a series of steps for connecting two carbon steel shafts with two end faces of an aluminum alloy part respectively to manufacture a rotor for a compressor. A resulting rotor 1 is illustrated in FIG. 2 in cross section. The rotor 1 may be a male or female rotor for a screw compressor. The aluminum part 2 is a near net part which has threads or ridges on its outer periphery (not shown) and is made by hot rolling or cold extrusion. In FIG. 2, the carbon steel shafts 3 outwardly extend from the opposite end faces of the aluminum part 2 respectively, and gears and bearings (not shown) will be mounted on the shafts 3 when the rotor 1 is assembled in a compressor casing. The steel shafts 3 have a coefficient of linear expansion similar to that of the gear or bearing.

In order to manufacture the rotor 1, the aluminum part 2 and two steel shafts 3 are separately prepared. Then, the aluminum part 2 undergoes T6 treatment to raise its strength such that it has certain hardness which is comparable to the steel shaft 3.

T6 treatment includes solution treatment above its solution temperature, quenching, and accelerated aging between 120–200 degrees C. for a certain period. In this particular embodiment, T6 treatment is conducted to raise the strength/hardness of the aluminum part 2 to one third that of the steel shaft 3.

After T6 treatment, the aluminum part 2 is fixed by a divisible holder having upper and lower halves which define a hollow space therein (not shown). The holder clamps the aluminum part 2 such that end faces of the aluminum part 2 are exposed. Configuration of the hollow space of the holder corresponds to an outer configuration of the aluminum part 2.

The steel shafts 3 are pressed against the exposed end faces of the aluminum part 2 by a prescribed force while rotating them relative to the aluminum part 2. Directions of rotation are arbitrary, i.e., same direction or opposite directions. Alternatively, the aluminum part 2 and the holder may be rotated against stationary steel shafts 3. In this case, the steel shafts 3 are simply pressed to the aluminum part 2. It is also satisfactory that both the steel shafts 3 and the aluminum part 2 are simultaneously rotated in opposite directions.

Since the hardness of the end faces of the aluminum part 2 are close to that of the steel shafts 3, relative rotation between the aluminum part 2 and the steel shafts 3 under certain opposite pressing forces directed to the end faces of the aluminum part 2 peels oxide films from interfaces 4 of the aluminum part 2 and the steel shafts 3 and reveals activated surfaces on the interfaces 4. Before the interfaces are oxidized, the steel shafts 3 are bonded to the mating end faces of the aluminum part 2 by the pressing forces. Therefore, the three parts are firmly connected with each other by the metal-to-metal bonding. This is friction welding. The peeled oxide films are pushed aside by the relative rotation between the shafts 3 and the aluminum alloy element 2.

Since the metal-to-metal bonding is taken advantage of, this connecting method can use an inexpensive aluminum alloy as the aluminum part 2. It should be remembered that a conventional method which depends upon shrinkage fitting must use an expensive aluminum alloy to insure particular strength in the aluminum part. Also, unlike the conventional method, the aluminum part 2 does not need a through hole. Therefore, the process of making the rotor 1 according to the present invention does not require a drilling step. As compared with another conventional method which relies upon insert molding, the connecting method of the invention does not have to change a coefficient of linear expansion of the steel shaft at its center portion. Also, the insert molding is often more costly and troublesome than the friction welding. If a steel shaft extends through an aluminum part, a manufacturing cost is raised. The rotor 1 of the present invention does not have such a steel shaft penetration construction.

In addition, the steel shafts 3 do not penetrate the aluminum part 2 so that the weight of the rotor 1 is lighter than a conventional rotor having a steel shaft extending therethrough.

Furthermore, the aluminum part 2 can be prepared by a simple and inexpensive method such as hold rolling or cold extrusion. This also contributes to reduction of the manufacturing cost.

Various modifications and changes may be made without departing spirit and scope of the invention. One modification is illustrated in FIG. 3.

In order to enlarge a contact area between the aluminum part and the steel shafts, recesses 5 are formed in the end faces of the aluminum part 2a and the shafts 3a have mating extensions. The illustrated recess 5 is a cylindrical concave and the extension of the shaft 3a is a cylindrical convex having a corresponding shape.

A rotor 1a is manufactured by inserting the extensions of the steel shafts 3a into the mating recesses 5 of the aluminum part 2, and pressing and rotating the steel shafts 3a therein (friction welding). Larger contact area improves connection strength.

Figure 3:
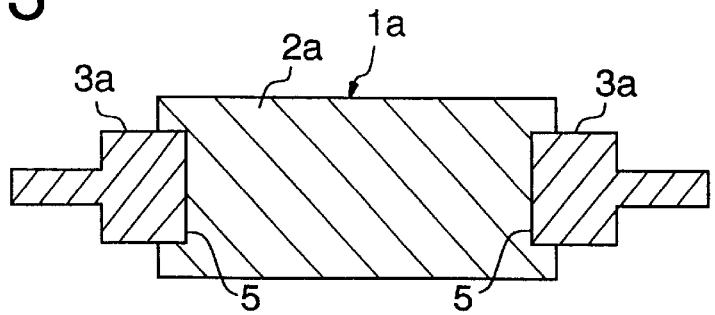
FIG. 3 illustrates a sectional view of a rotor in another embodiment of the present invention.
Figure 4A:
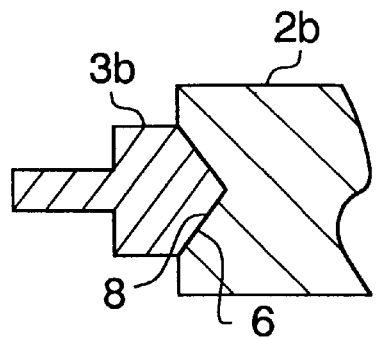
FIG. 4A illustrates a sectional view of left half of a rotor in still another embodiment of the present invention.
Figure 4B:
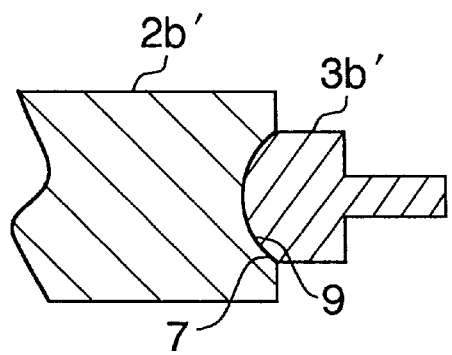
FIG. 4B illustrates a sectional view of right half of a rotor in yet another embodiment of the present invention.

Shapes of the recess 5 and the fitting extension are not limited to those shown in FIG. 3. For instance, as depicted in FIG. 4A, a conical recess 6 may be formed in the end face of the aluminum part 2b and the shaft 3b may have a mating conical extension 8, and as depicted in FIG. 4B, a hemispherical recess 7 may be formed in the end face of the aluminum part 2b' and the steel shaft 3b' may have a mating hemispherical extension 9.

Figure 4C:
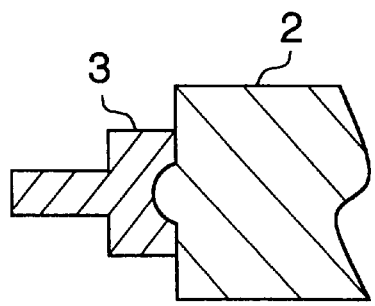
FIG. 4C illustrates a sectional view of left half of a rotor in another embodiment of the present invention.

It should be noted that a recess may be formed in the steel shaft 3 and a mating projection may be formed on the aluminum part 2 as illustrated in FIG. 4C. It should also be noted that the steel shaft may be softened before connection with the aluminum part. The softening treatment may be carried out instead of or in addition to hardening treatment to the aluminum part. This will further narrow hardness difference between the steel part and the aluminum part and facilitate their metal-to-metal connection. The softening may be conducted by annealing.

Now, a second embodiment of the present invention will be described with FIGS. 5 and 6.

Figure 6:
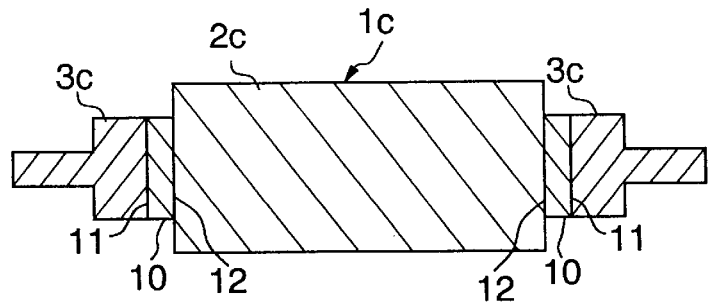
FIG. 6 is a sectional view of a rotor produced by the process shown in FIG. 5.
Figure 7:
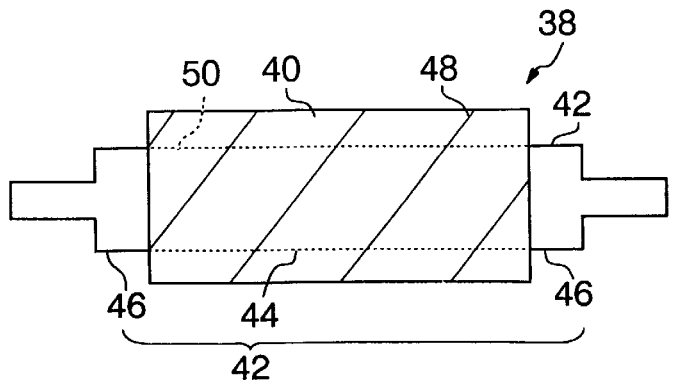
FIG. 7 illustrates a view of a rotor made by a conventional method.

Referring first to FIG. 6, a rotor 1c of this embodiment includes third parts or insert members 10 which have an intermediate hardness and are interposed between an aluminum part 2c and steel shafts 3c. The third part or insert member 10 may be made from stainless which is softer than the carbon steel but harder than the aluminum alloy such as SUS. Each third part 10 has a face 12 which is to be bonded to a mating end face of the aluminum alloy part 2c and another face 11 which is to be bonded to the carbon steel shaft 3c.

Figure 5:
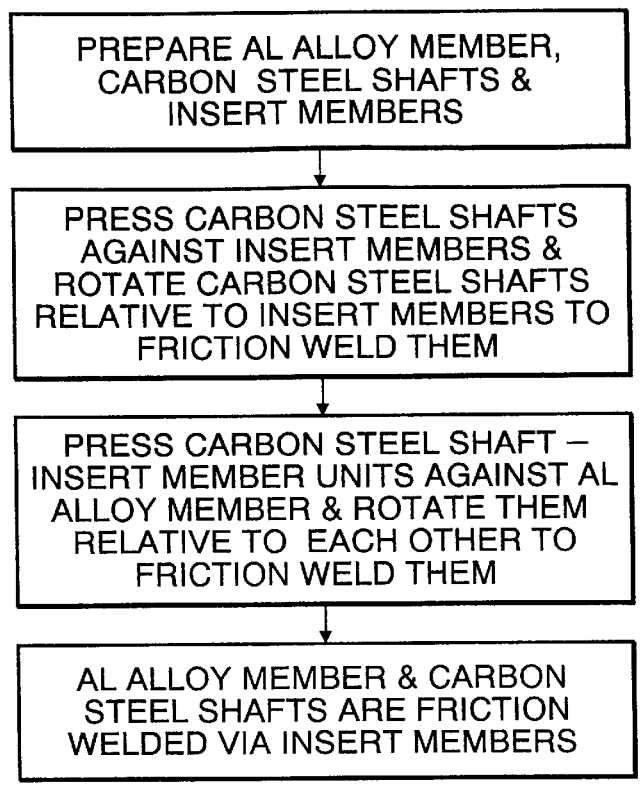
FIG. 5 depicts another process chart for friction welding steel parts with an aluminum part using intermediate members according to the present invention.

Referring to FIG. 5, after preparing one aluminum part 2c, two steel shafts 3c and two intermediate members 10, the intermediate members 10 and the steel shafts 3c are friction welded to each other at their inner faces 11 by pressing them against each other and rotating them relative to each other. Pressing and rotating the intermediate parts 10 against the steel shaft 3c remove oxide films from their interfaces 11. Following this, the shaft-and-intermediate-part units are friction welded to the aluminum part 2c in a similar manner. It should be noted that coupling of the intermediate parts 10 with the aluminum part 2c may be conducted prior to coupling of the intermediate parts 10 with the steel shafts 3c.

Since there is no substantial difference between the aluminum part 2c and the intermediate part 10 in hardness and between the intermediate part 10 and the steel part 3c, heat treatment for raising hardness of the aluminum part 2c is unnecessary in this embodiment. This reduces a manufacturing cost.

It should be noted that the aluminum part 2c may be heat treated if desired to further reduce hardness difference between the aluminum part 2c and the intermediate parts 10. The heat treatment may be T6 treatment. This facilitates the friction welding between the aluminum part 2c and the intermediate parts 10. If the hardness difference becomes smaller between the aluminum part 2c and the intermediate parts 10 (and that between the intermediate parts 10 and the steel parts 3c), less pressing and rotating forces are required for the friction welding. With the smaller pressing and rotating forces, the coupled parts (i.e., the resulting rotor 1c) have less deformations.

It should also be noted that the steel parts 3c may be softened to reduce hardness difference between the third part 10 and the steel part 3 instead of or in addition to hardening treatment to the aluminum part 2c. Furthermore, the end face 12 of the third parts 10 may be softened to make its hardness closer to the aluminum part 2c and the other end face 11 may be hardened to make its hardness closer to the steel part 3c. Also, like the embodiments shown in FIGS. 3, 4A, 4B and 4C, projections may be formed on the first and/or second faces 11 and 12 of each third part 10 and recesses may be formed in the mating faces of the aluminum part and steel part, or vice versa.

What is claimed is:

1. A method of connecting an aluminum part with a steel part, said method comprising the steps of:

A) heat treating the aluminum part to make the hardness of the aluminum part closer to that of the steel part;

B) softening the steel part to further reduce the hardness difference between the aluminum part and the steel part; and C) pressing the aluminum part and the steel part against each other while rotating them relative to each other to remove oxide films at an interface of the aluminum part and steel part and metal-bond them to each other.

2. The method of claim 1, wherein the step A) includes T6 for treatment.

3. The method of claim 1, wherein the hardness of the aluminum part becomes about one third of hardness of the steel part by the step A).

4. The method of claim 2, wherein the hardness of the aluminum part becomes about one third of hardness of the steel part by the step A).

5. A method of connecting an aluminum part with a steel part, said method comprising the steps of:

A) hardening the aluminum part to make the hardness of the aluminum part closer to that of the steel part;

B) softening the steel part to further reduce the hardness difference between the aluminum part and the steel part;

C) forming a recess in the aluminum part;

D) forming a mating projection on the steel part;

E) inserting the projection of the steel part into the recess of the aluminum part; and F) pressing the aluminum part and the steel part against each other while rotating them relative to each other to remove oxide films at an interface of the aluminum part and steel part and to metal-bond them to each other.

6. The method of claim 5, wherein the step A) includes T6 treatment.

7. The method of claim 5, wherein the hardness of the aluminum part becomes about one third of hardness of the steel part by the step A).

8. The method of claim 6, wherein the hardness of the aluminum part becomes about one third of hardness of the steel part by the step A).

9. A method of connecting an aluminum part with a steel part, said method comprising the steps of:

A) hardening the aluminum part to make the hardness of the aluminum part closer to that of the steel part;

B) softening the steel part to further reduce the hardness difference between the aluminum part and the steel part;

C) forming a recess in the steel part;

D) forming a mating projection on the aluminum part;

E) inserting the projection of the aluminum part into the recess of the steel part; and F) pressing the aluminum part and the steel part against each other while rotating them relative to each other to remove oxide films at an interface of the aluminum part and steel part and to metal-bond them to each other.

10. The method of claim 9, wherein the step A) includes T6 treatment.

11. The method of claim 9, wherein the hardness of the aluminum part becomes about one third of the hardness of the steel part by the step A).

12. The method of claim 10, wherein the hardness of the aluminum part becomes about one third of the hardness of the steel part by the step A).

* * * * *